(12) United States Patent
Nakano

(10) Patent No.: US 6,435,551 B1
(45) Date of Patent: Aug. 20, 2002

(54) INFLATOR AND AIRBAG DEVICE

(75) Inventor: Yoshiyuki Nakano, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/318,259

(22) Filed: May 25, 1999

(30) Foreign Application Priority Data

May 29, 1998 (JP) .......................................... 10-149534

(51) Int. Cl.⁷ .............................................. B60R 21/28
(52) U.S. Cl. ...................................................... 280/741
(58) Field of Search ........................................ 280/741

(56) References Cited

U.S. PATENT DOCUMENTS

| | | | | |
|---|---|---|---|---|
| 4,950,458 A | * | 8/1990 | Cunningham | 422/164 |
| 5,033,390 A | * | 7/1991 | Minert et al. | 102/530 |
| 5,219,178 A | * | 6/1993 | Kobari et al. | 280/736 |
| 5,536,040 A | * | 7/1996 | Cuevas et al. | 280/737 |
| 5,564,743 A | * | 10/1996 | Marchant | 280/741 |
| 5,630,619 A | * | 5/1997 | Buchanan et al. | 280/741 |
| 5,709,406 A | * | 1/1998 | Buchanan | 280/737 |
| 5,799,973 A | * | 9/1998 | Bauer et al. | 280/741 |
| 5,871,288 A | * | 2/1999 | Lindsey et al. | 280/728.2 |
| 5,934,705 A | * | 8/1999 | Siddiqui et al. | 280/736 |

FOREIGN PATENT DOCUMENTS

| | | |
|---|---|---|
| EP | 0 428 298 | 5/1991 |
| EP | 0 792 776 | 9/1997 |
| EP | 0 888 935 | 1/1999 |
| FR | 2 233 202 | 1/1975 |
| JP | 9-136604 | 5/1997 |

OTHER PUBLICATIONS

"37941 Variable Output Pyrotechnic Air Bag Inflator", Research Disclosure, No. 397, Nov. 1, 1995, pp. 743–745, XP000549207, ISSN: 0374-4353.

* cited by examiner

*Primary Examiner*—Charles T. Jordan
(74) *Attorney, Agent, or Firm*—Kanesaka & Takeuchi

(57) ABSTRACT

An inflator is formed of a cylindrical casing, and a partition situated in the casing to be offset from a middle in a longitudinal direction of the casing to one end side of the casing. Thus, the casing has a first chamber on the one end side and a second chamber on the other end side. A gas generant is filled in the first and second chambers for generating gases. First holes are formed in the casing only near the partition to communicate with the first chamber. When the gas generant in the first chamber is ignited, a gas is ejected through the first holes near the partition to inflate the airbag as equal as possible in the longitudinal direction. Second holes are formed in the casing only at the middle in the longitudinal direction of the casing to communicate with the second chamber. When the gas generant in the second chamber is ignited, a gas is ejected through the second holes at the middle of the casing to equally inflate the airbag in the longitudinal direction.

4 Claims, 2 Drawing Sheets

INFLATOR AND AIRBAG DEVICE

BACKGROUND OF THE INVENTION AND RELATED ART STATEMENT

The present invention relates to an inflator for inflating an airbag which is installed in a vehicle including an automobile and, more particularly, to an inflator which generates gases in multiple stages. The present invention further relates to an airbag device having the inflator.

An airbag device protects an occupant by an airbag which is inflated by gases generated by an inflator.

Japanese patent publication 9-136604 discloses an inflator having a casing which is divided into two small combustion chambers, each of which is filled with gas generating agents. By igniting the two combustion chambers at different timings, the airbag is adjusted in its inflation speed and the inflation continuing time period. When a collision is made in small magnitude, only one of the combustion chambers is ignited.

As clearly shown in the drawings of the publication 9-136604, the inflator has the first combustion chamber disposed at one end side and the second chamber disposed at the other end side of the casing, and gas spout holes are formed in the respective middle portions in the longitudinal direction of the combustion chambers. Therefore, when gas spouts only from the first chamber, gas is introduced only from the one end side of the casing into the airbag so that a one-end-side portion of the airbag is inflated quickly and largely as compared to the other-end-side portion of the airbag. In the same manner, when gas spouts only from the second chamber, gas is introduced only from the other end side of the casing into the airbag so that the other-end-side portion of the airbag is inflated quickly and largely as compared to the one-end-side portion of the airbag.

OBJECT AND SUMMARY OF THE INVENTION

It is an object of the present invention to provide an inflator which inflates an airbag in bilateral symmetry as a whole and to provide an airbag device having the inflator.

An inflator of the present invention has a cylindrical casing, at least one partition defining a plurality of chambers in the casing which is arranged in the longitudinal direction of the casing, gas generating agents filled in the chambers, and gas spout holes formed in the casing. The holes are disposed close to the middle in the longitudinal direction of the casing.

An airbag device of the present invention has a container, an airbag folded and accommodated in the container, and the inflator of the present invention for inflating the airbag.

In the airbag device having the inflator as mentioned above, no matter whether gas spouts from either of the chambers, the gas spouts from substantially the middle or the vicinity of the middle in the longitudinal direction of the casing of the inflator whereby the airbag is inflated into a bilaterally symmetrical configuration as a whole.

It is preferable that the inside of the casing is divided into two chambers by the partition. Particularly, it is preferable that the partition is disposed to be offset from the middle in the longitudinal direction of the casing to one end side of the casing so that the casing has a first chamber on the one end side and a second chamber on the other end side, and that the holes formed in the first chamber are disposed close to the partition and the holes formed in the second chamber are disposed about the middle in the longitudinal direction of the casing.

In the airbag device, it is preferable that the container has a configuration elongated in the longitudinal direction of the inflator, the partition of the inflator is disposed to be offset from the middle in the longitudinal direction of the container to one end side of the container, the holes formed in the first chamber on the one end side are disposed as close to the middle in the longitudinal direction of the container as possible, and that the holes formed in the second chamber on the other end side are disposed about the middle in the longitudinal direction of the container.

BRIEF DESCRIPTION OF THE DRAWINGS

FIG. 1b is a front view of the container, and FIG. 1c is a side view of the container.

DETAILED DESCRIPTION OF PREFERRED EMBODIMENTS

Hereinafter, preferred embodiments of the present invention will be described with reference to the attached drawings.

Figure 1A:
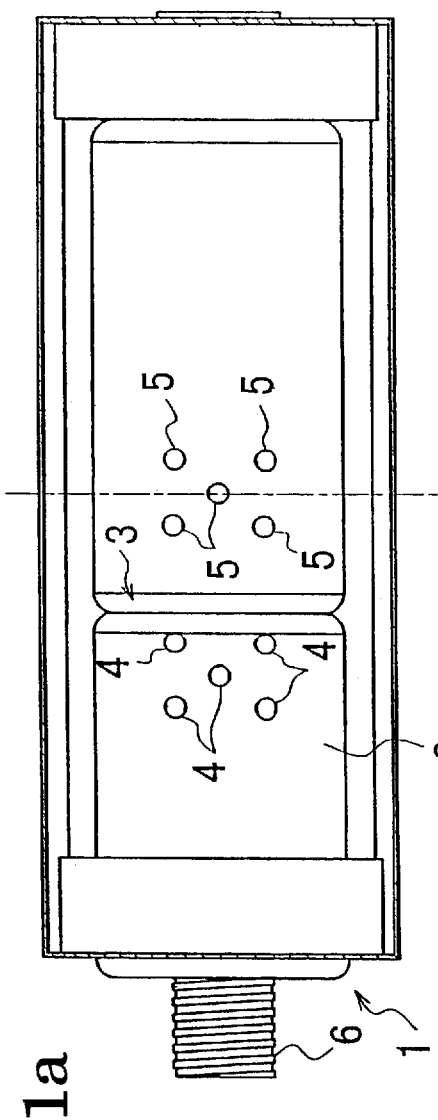
FIGS. 1a–c illustrate a structure of a container (a housing for accommodating an airbag of a passenger airbag device with an inflator according to an embodiment of the present invention, wherein FIG. 1a is a sectional view taken along a line 1a—1a of FIG. 1b.
Figure 1B:
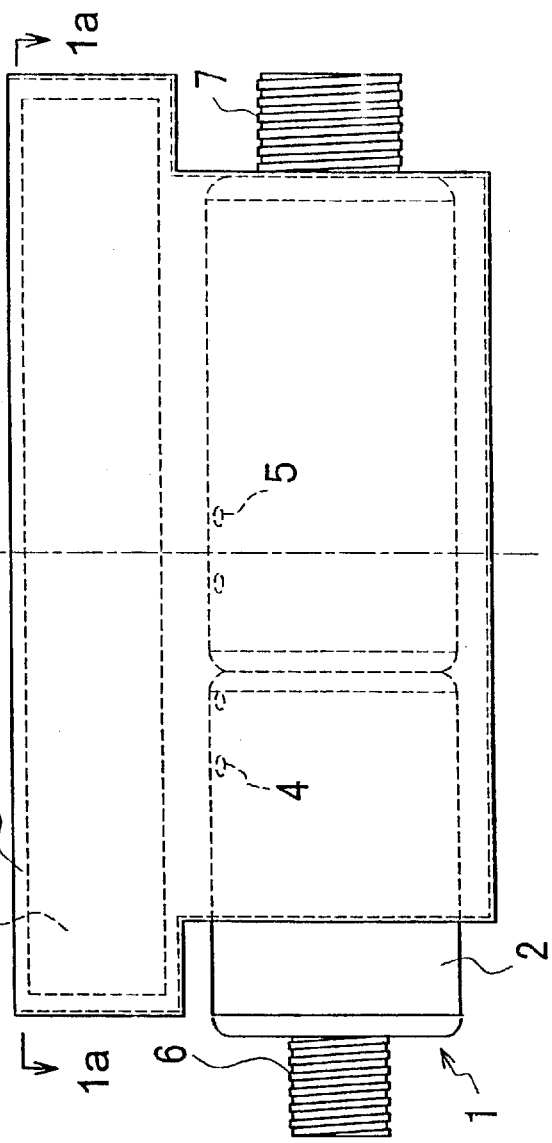
Figure 2:
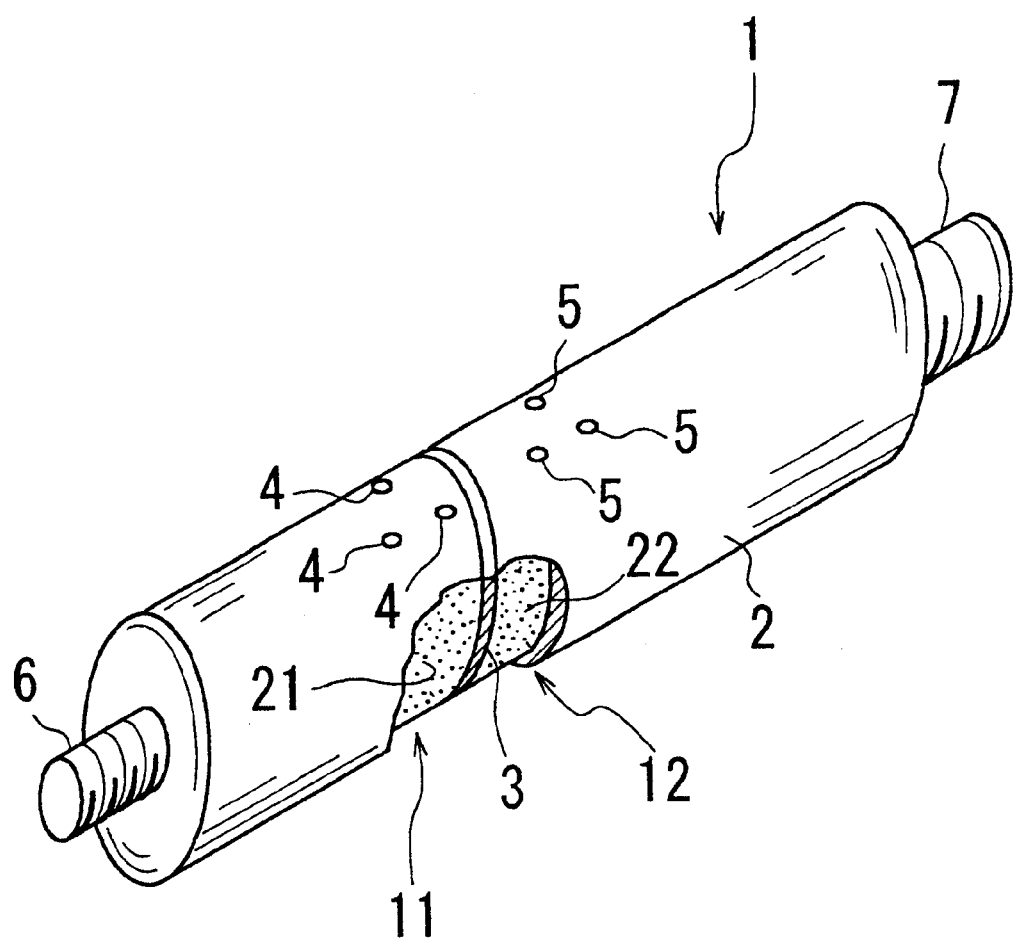
FIG. 2 is a perspective view of the inflator.

As shown in FIG. 2 an inflator 1 has a cylindrical casing 2, the inside of which is divided into two chambers, i.e. a first chamber 11 and a second chamber 12, by a partition 3. The casing 2 may be composed of an integral material from the left end to the right end in FIGS. 1a, 1b and may be provided with the partition 3 inside thereof to form the first chamber and the second chamber. Alternatively, the casing 2 may comprise a first casing for the first chamber and a second casing for the second chamber which are integrally connected to each other. The casing 2 is made of metal such as aluminum or aluminum alloy.

The partition 3 defining the first chamber and the second chamber is positioned to be offset from the middle in the longitudinal direction of casing 2 to the left side of FIGS. 1a, 1b so that the first chamber 11 is smaller than the second chamber 12.

The casing 2 is provided with gas spout holes or first holes 4 for allowing gas to spout from the chamber 11 and gas spout holes or second holes 5 for allowing gas to spout from the chamber 12. As for the first chamber 11 positioned on the left side in the figure, a plurality of the holes 4 formed therein are located as close to the partition 3 as possible. As for the second chamber 12 positioned on the right side in the figure, a plurality of the holes 5 formed therein are located about the middle of the longitudinal direction of the casing 2.

Filled in the chambers 11, 12 are gas generant 21, 22 for generating gases, respectively. The chambers 11, 12 are provided with igniters 6, 7.

Figure 1C:
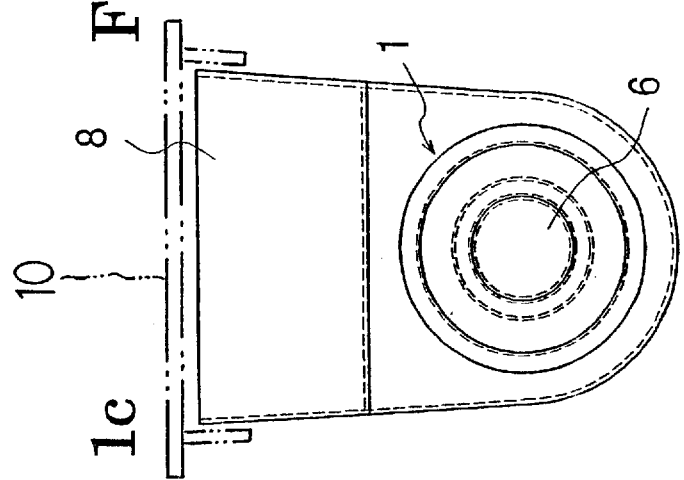

As shown in FIGS. 1a–1c, the inflator 1 is disposed in a lower or rear portion of a container 8 in which the folded airbag 9 is accommodated. The top or front face of the container 8 is covered by a lid 10 (shown by two-dot chain lines in FIG. 1c). The container 8 is formed in a vessel-like configuration elongated in the longitudinal direction of the inflator 1. The holes 5 formed in the second chamber of the inflator 1 are disposed about the middle in the longitudinal direction of the container 8. Particularly according to this embodiment, the holes 5 are disposed symmetrically about the center line C of the container 8.

In the airbag device having the inflator 1 structured as mentioned above, no matter whether gas spouts from either of the first chamber 11 and the second chamber 12, the gas spouting through the holes 4, 5 spouts out about the center of the airbag 9 whereby the airbag 9 is inflated into a laterally symmetrical configuration in front of the occupant.

Though two chambers, the first and second chambers are provided in the above embodiment, three chambers or more may be provided.

As mentioned above, according to the present invention, in case of inflating an airbag by using an inflator having a plurality of chambers, the airbag can be inflated into a laterally symmetrical configuration in front of an occupant. Particularly, even if gas spouts only from one chamber, the airbag can be inflated into a laterally symmetrical configuration.

What is claimed is:

1. An inflator comprising:

a cylindrical casing, a partition situated in the casing to be offset from a middle in a longitudinal direction of the casing to one end side of the casing so that the casing has a first chamber on the one end side and a second chamber on the other end side, a gas generant filled in the first and second chambers for generating gases, first holes formed in the casing only near the partition to communicate with the first chamber so that when the gas generant in the first chamber is ignited, a gas is ejected through the first holes near the partition to inflate the airbag as equal as possible in the longitudinal direction, and second holes formed in the casing only at the middle in the longitudinal direction of the casing to communicate with the second chamber so that when the gas generant in the second chamber is ignited, a gas is ejected through the second holes at the middle of the casing to equally inflate the airbag in the longitudinal direction.

2. An inflator according to claim 1, wherein said first and second holes are formed only on one side of the casing.

3. An airbag device comprising:

an elongated container extending in a longitudinal direction, an airbag folded and accommodated in the container, and an inflator for inflating the airbag and situated in the container, said inflator including:

a cylindrical casing extending along the longitudinal direction of the container, a partition situated in the casing to be offset from a middle in the longitudinal direction of the container to one end side of the container so that the casing has a first chamber on the one end side and a second chamber on the other end side, a gas generant filled in the first and second chambers for generating gases, first holes formed in the casing only near the partition to communicate with the first chamber so that when the gas generant in the first chamber is ignited, a gas is ejected through the first holes near the partition to inflate the airbag as equal as possible in the longitudinal direction of the container, and second holes formed in the casing only at the middle in the longitudinal direction of the container to communicate with the second chamber so that when the gas generant in the second chamber is ignited, a gas is ejected through the second holes at the middle of the container to equally inflate the airbag in the longitudinal direction.

4. An airbag device according to claim 3, wherein said first and second holes are formed only on one side of the casing facing the airbag.

* * * * *